Dec. 24, 1963     F. A. ANETSBERGER ET AL     3,115,084
FRIED FOOD PRODUCTION EQUIPMENT
Filed Jan. 30, 1957          9 Sheets-Sheet 6

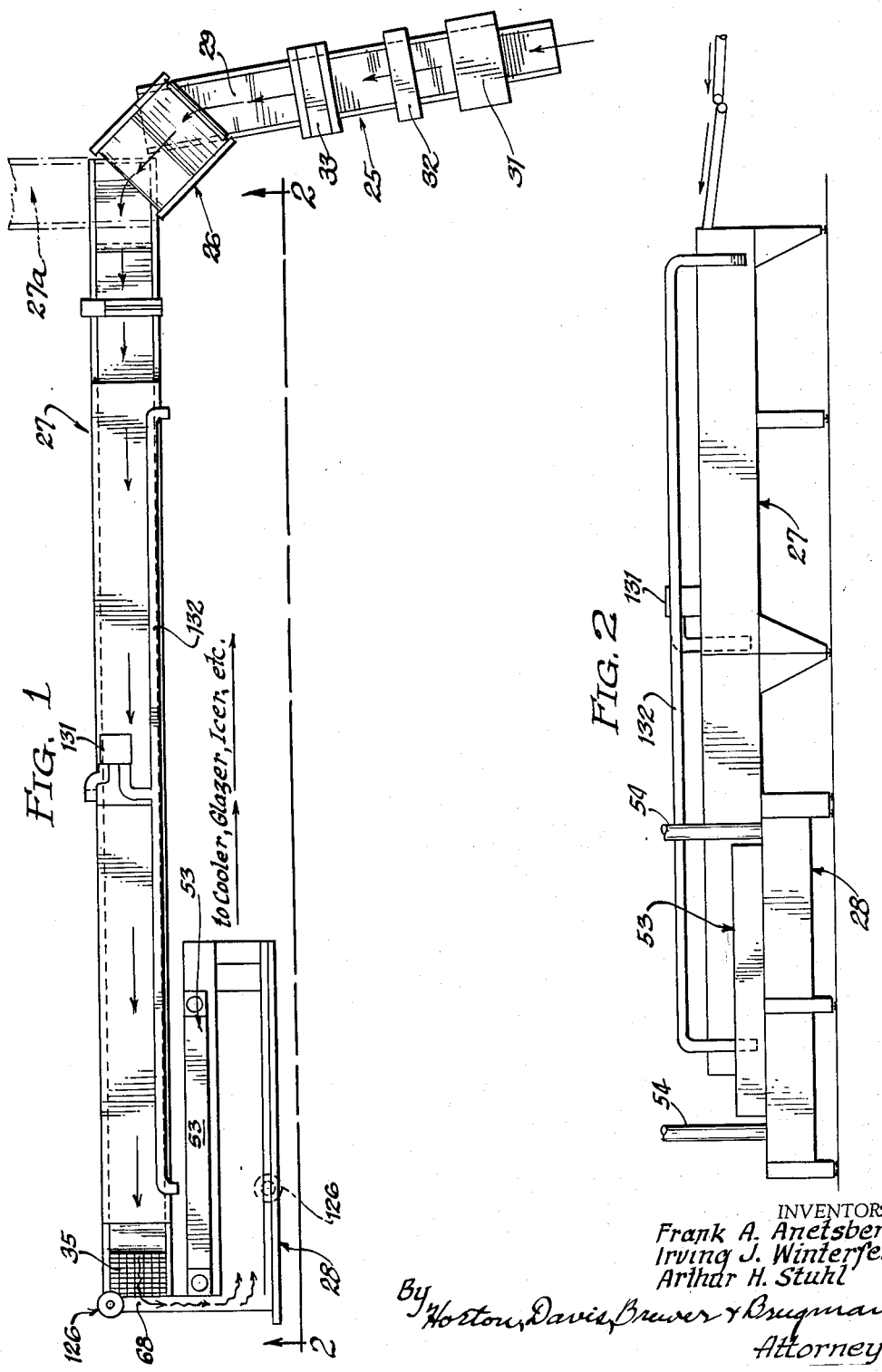

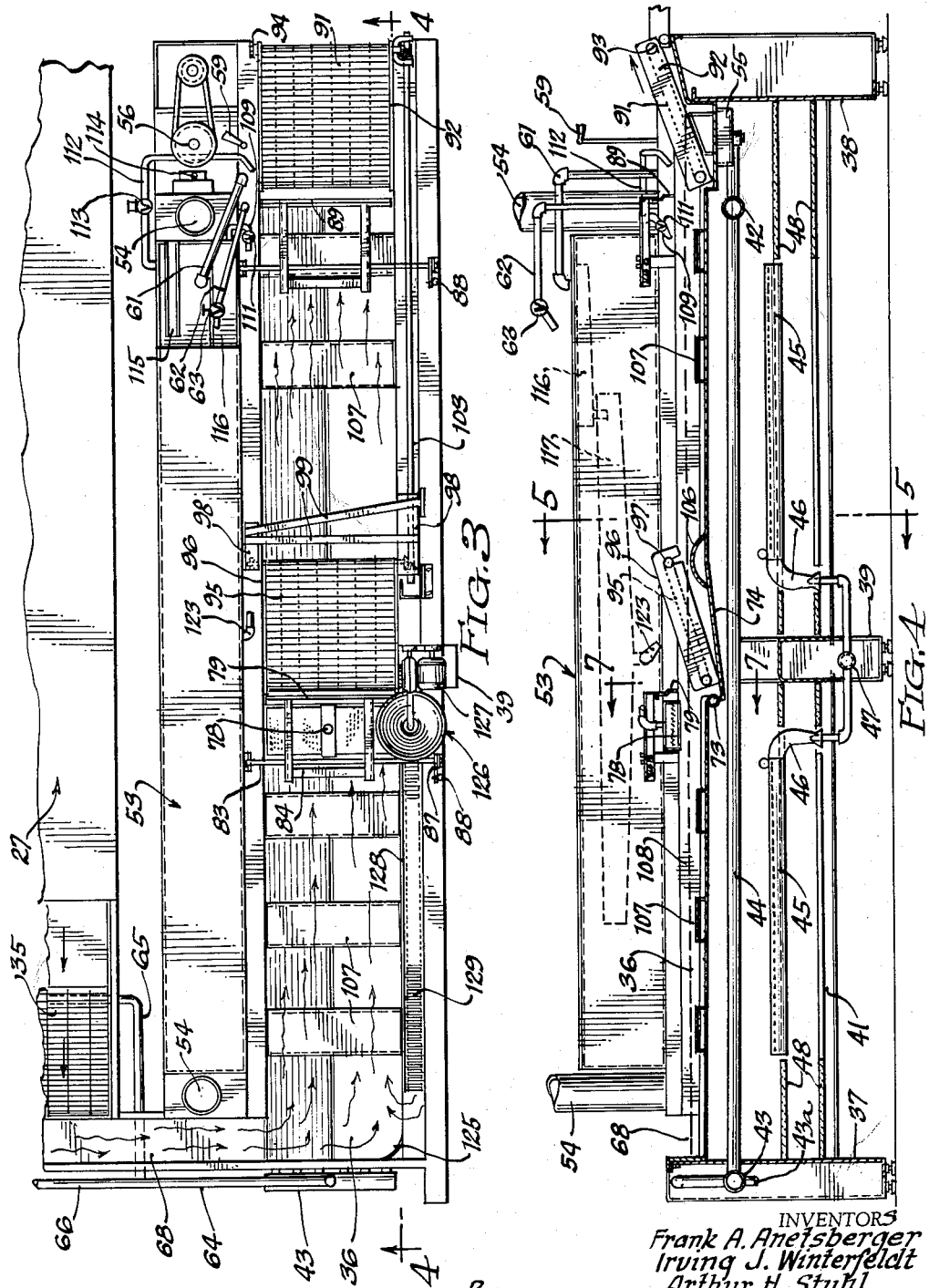

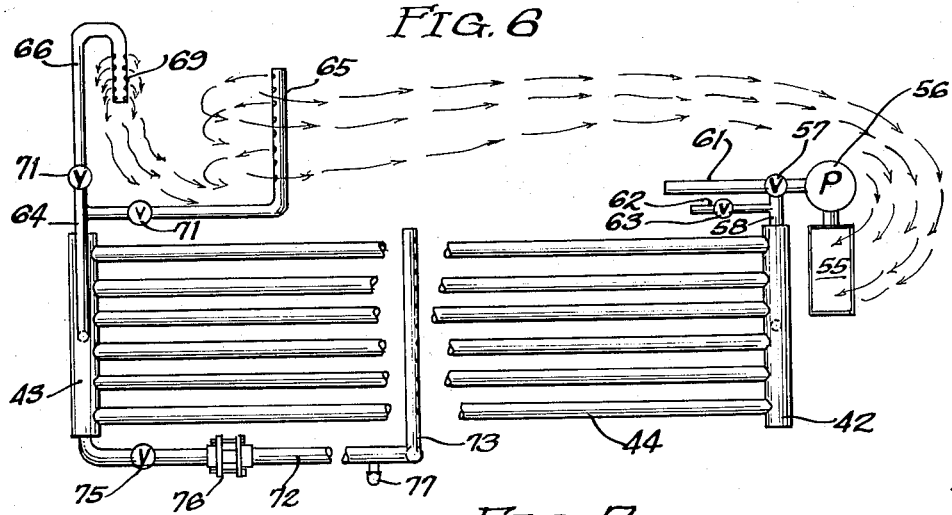
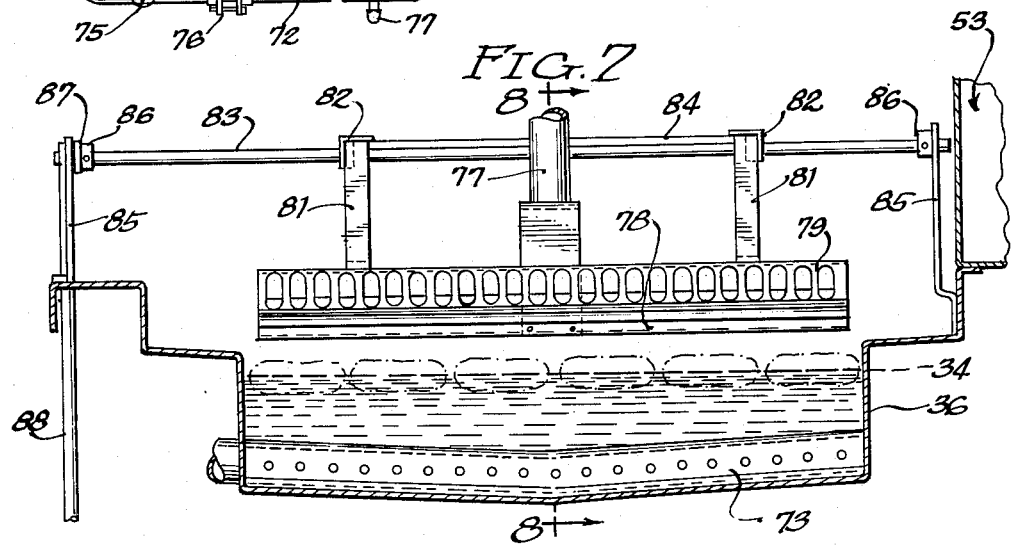
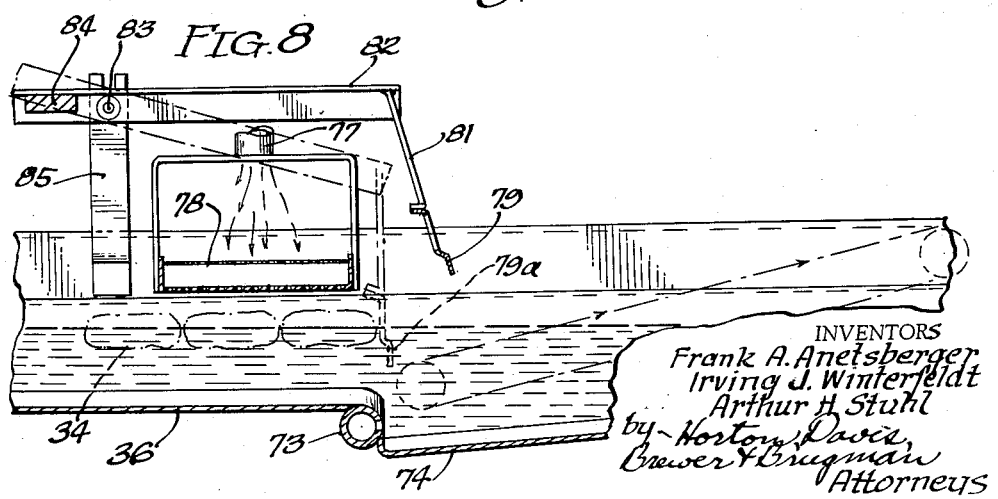

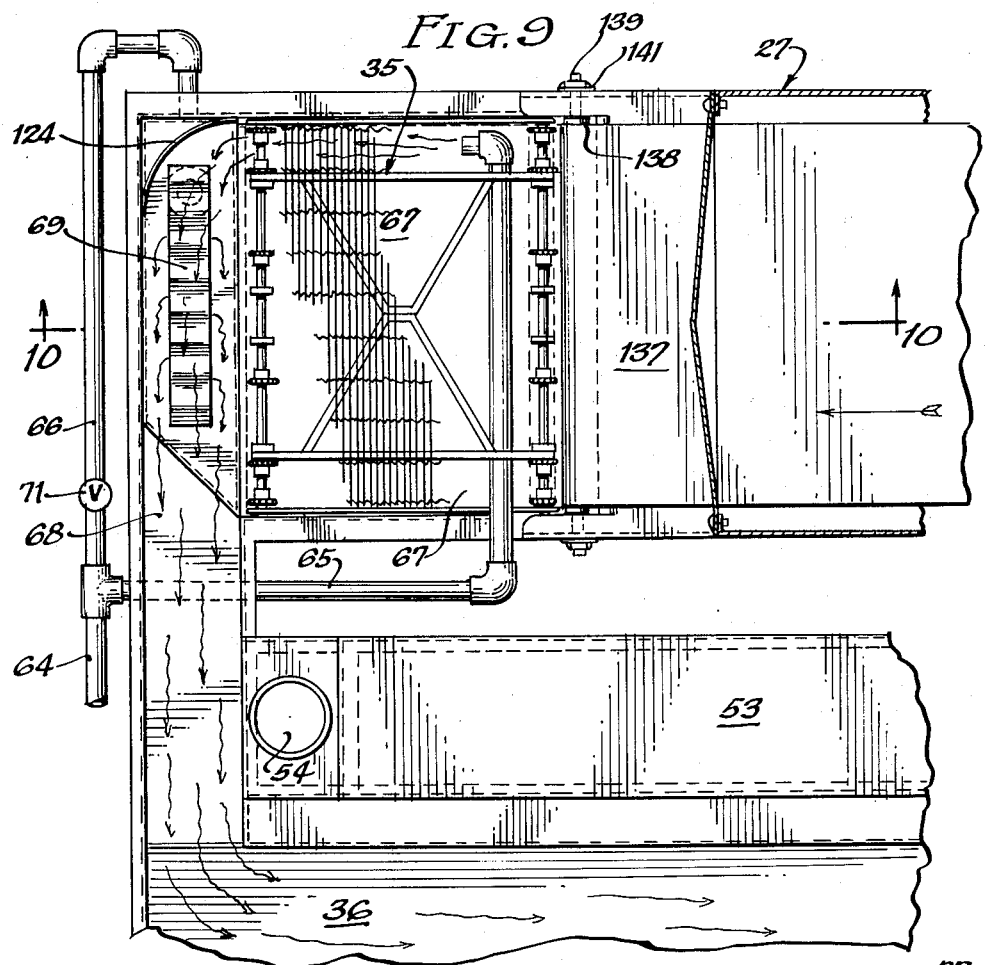
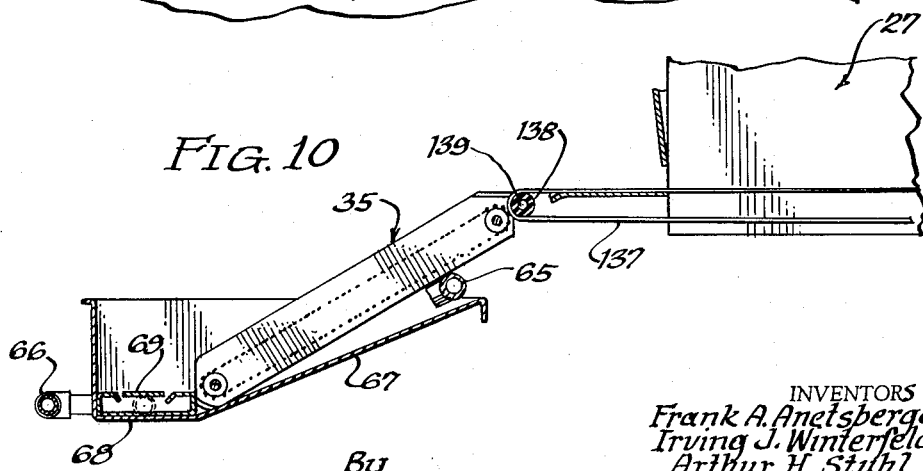

INVENTORS
Frank A. Anetsberger
Irving J. Winterfeldt
Arthur H. Stuhl
By Horton, Davis, Brewer & Brugman
Attorneys

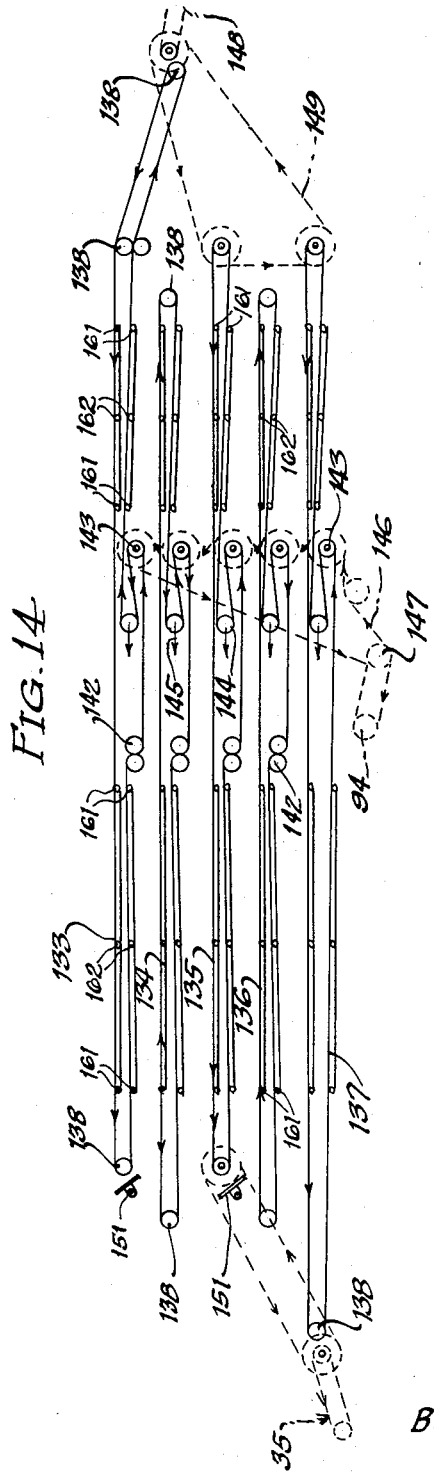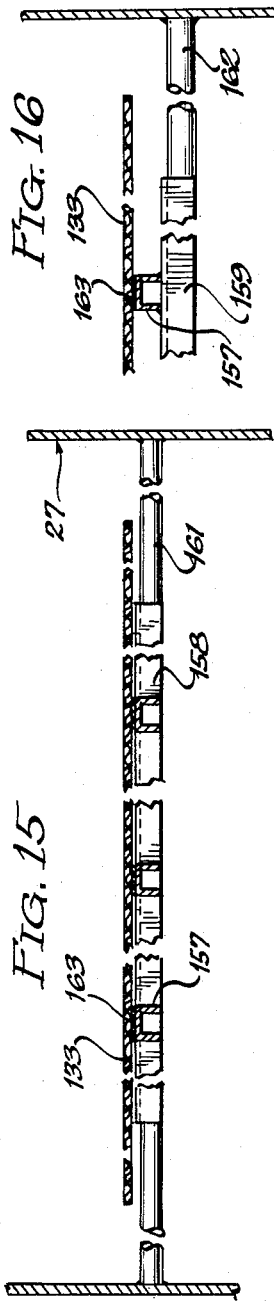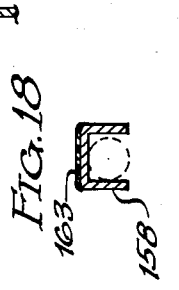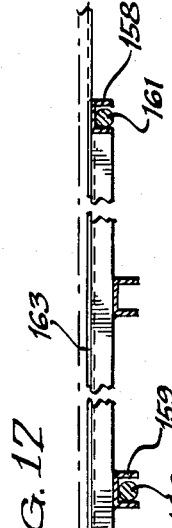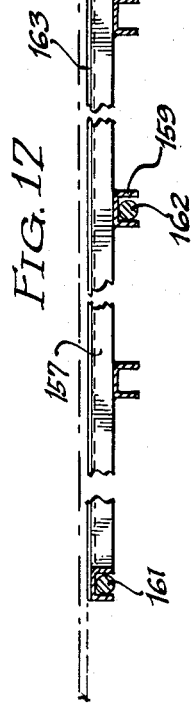

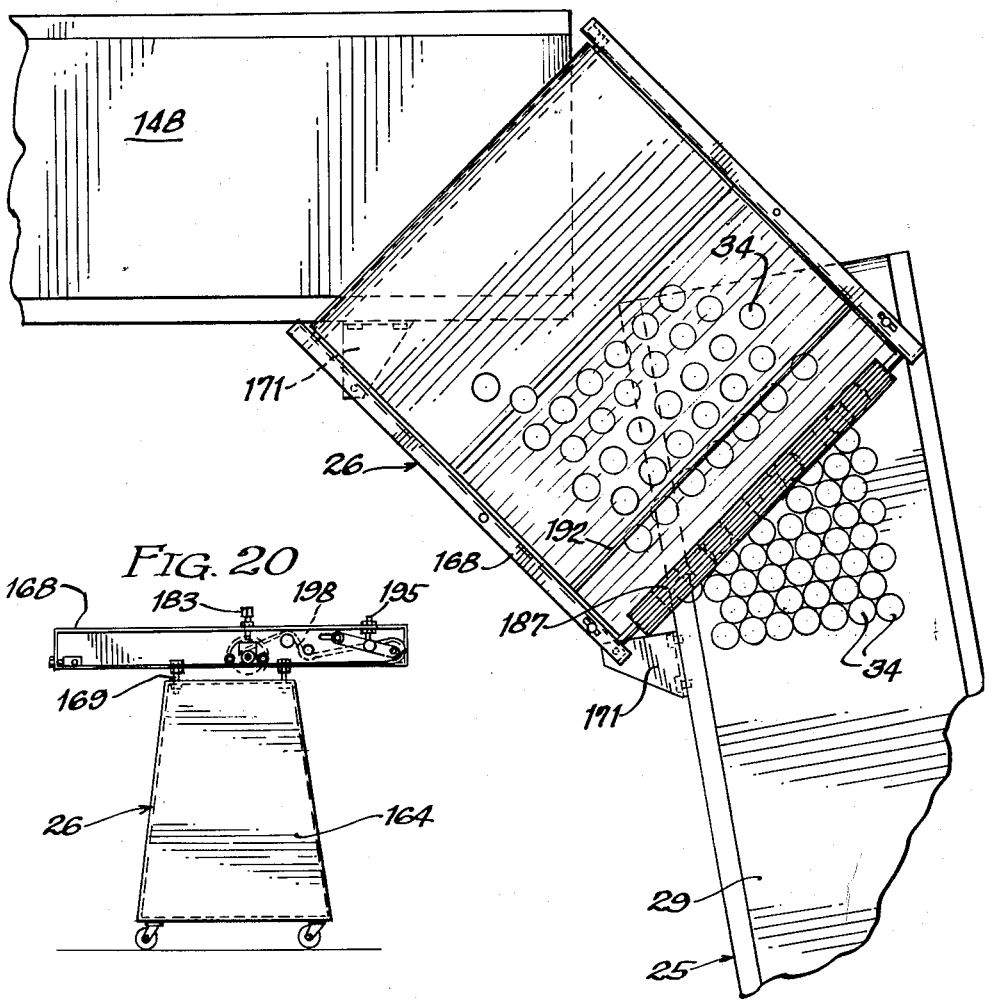
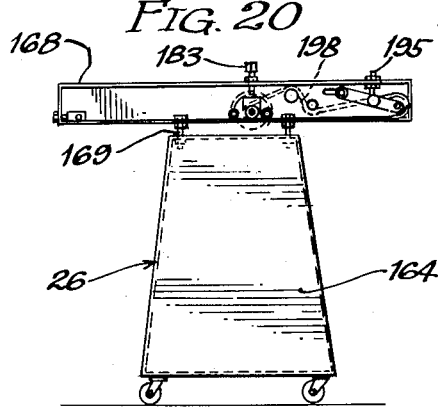
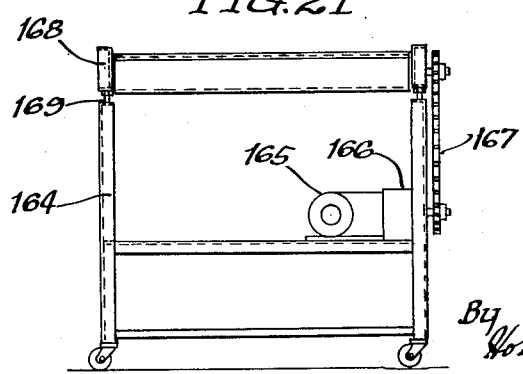

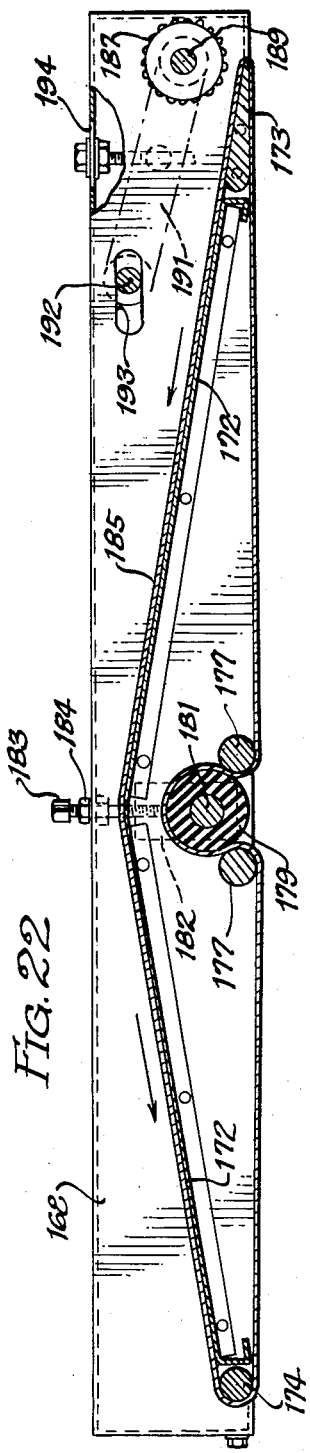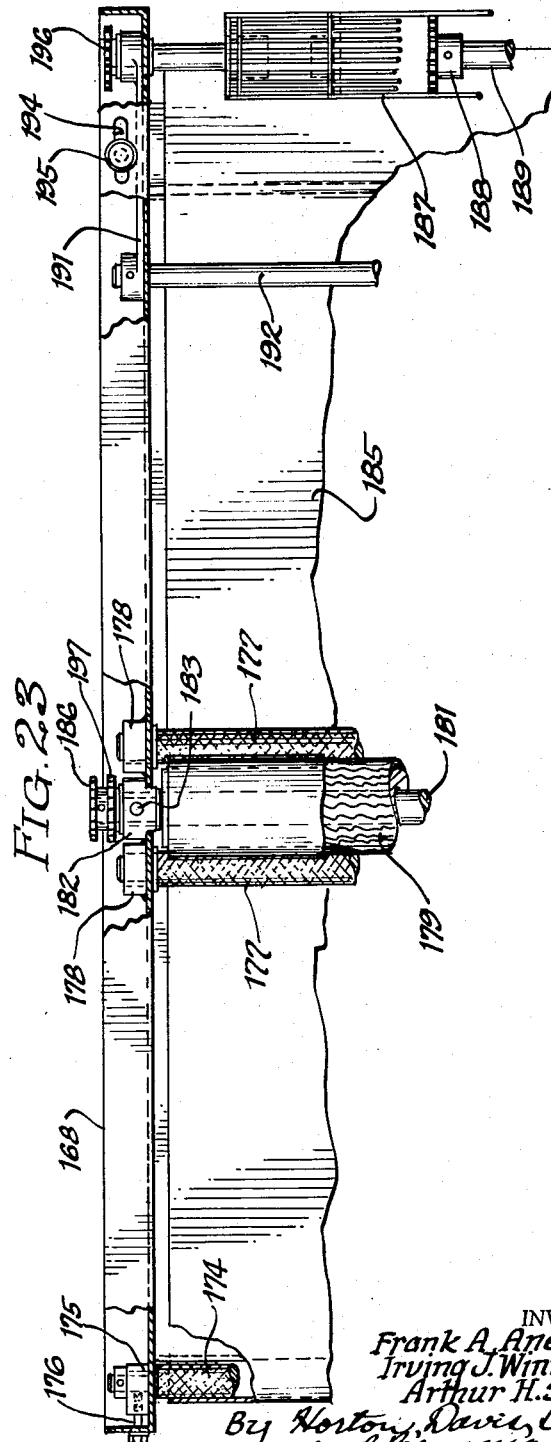

United States Patent Office 3,115,084
Patented Dec. 24, 1963

3,115,084
FRIED FOOD PRODUCTION EQUIPMENT
Frank A. Anetsberger, Northbrook, Ill., Irving J. Winterfeldt, Appleton, Wis., and Arthur H. Stuhl, Chicago, Ill., assignors to Anetsberger Brothers, Inc., Northbrook, Ill., a corporation of Illinois
Filed Jan. 30, 1957, Ser. No. 637,170
16 Claims. (Cl. 99—403)

This invention relates in general to cooking equipment, and more particularly to mechanism for frying yeast raised or cake doughnuts, French crullers, cinnamon rolls, and the like, completely automatically on a production basis.

A principal object of the invention is to reduce the cost of such cooking operations and to insure uniformity and consistently high quality in the finshied or cooked products.

This object is attained by very materially reducing the labor costs, especially in eliminating manual operations required in the use of prior equipment, and using a very much smaller quantity of cooking fat or shortening and pumping the same through the frying portion of the unit a great deal more rapidly than has been done heretofore, while maintaining a very small temperature differential throughout the complete cycle or path of travel of the heated fat, which prevents scorching or deterioration of the latter.

Another object of the invention is to provide a frying unit having a very shallow pot or basin defining a cooking trough through which the heated fat flows, together with tubes disposed below the cooking trough, pump means for cycling the fat through the tubes and trough, burners disposed below those tubes for heating the fat, and baffle means for protecting the bottom of the trough to prevent it from being burned out while insuring uniform heating thereof to eliminate cold spots.

A further object is to provide a reserve reservoir in such a frying unit to insure proper supply of make-up cooking fat to maintain substantially constant the quantity of fat circulating through the cooking trough, and to employ the exhaust gases from the tube and trough heating means to heat such reserve reservoir.

Another object is to effectively remove any solid particles from the cooking fat during operation of such a frying unit without interfering with the desired continuous cyclic flow of the fat through the unit.

Another object of the invention is to insure proper alignment and prevent jamming, over-riding or trapping of either cake or yeast raised doughnuts during their being floated through such a surface frying trough by the heating fat in a production machine adapted to fry either type of doughnut.

A further object is the provision of novel means for functionally dividing such cooking trough into first and second basins for frying opposite sides of the doughnuts, or other products, including means for automatically turning the products over which is adjustable longitudinally of the trough to vary the relative cooking periods of the products in the two basins.

A further object is to control the expansion during cooking, and prevent cracking of the upper surfaces, of products being floatingly fried in fat, which is accomplished by providing novel means for spraying some of the heated fat over the upper surfaces of the products during a part of their cooking cycle.

Another important object of the invention is to eliminate handling in the manufacture or production of yeast raised products, such as doughnuts, by providing a proof box or cabinet having novel conveyor means for moving the products therethrough automatically while maintaining the same therein for the time required for proper proofing.

A further object is to conserve and reduce the amount of floor space required for such a continuous flow proofer by employing belt conveyor means having a number of runs vertically spaced from each other for travelling the products back and forth for substantially the full length of the proof cabinet, and providing novel means for supporting and preventing sagging of the several runs, while driving each of the same at a predetermined and uniform rate of speed.

Another object is to prevent misshaping or doubling over of dough pieces as they pass from one run to the next lower run and have their direction of travel reversed in such a proofer, and this object is attained by providing novel shutter-like guide means including means to facilitate adjustment thereof for use with different sizes of dough pieces.

Another object of the invention is to join such a continuous flow proofer to a continuous flow fryer synchronously for automatic and uninterrupted production of uniform products, which is accomplished by the provision of novel means for delivering the products into the heated fat stream and removing the same therefrom at predetermined speed ratios, either or both of which means may be driven by the proofer conveyor drive means.

Another important object is to effect further and substantially complete automation by providing novel separator and loader means for automatically transferring the formed pieces, such as for yeast raised doughnuts, from a make-up section, normally including a dough sheeter, cross roller and rotary die cutter, to the continuous flow proofer, and separating the pieces from each other in two directions, so that they will not interfere with each other because of their movements or expansion during their subsequent travel through the proofer.

A further object is to provide a novel method of surface frying food products automatically to insure uniformity of cooking of all of the products at a maximum rate of production in a minimum of space.

Numerous other objects and advantages of the invention will be apparent as it is better understood from the following description, which, when taken in connection with the accompanying drawings, discloses a preferred embodiment thereof.

In the drawings:

FIGURE 1 is a schematic lay-out in plan of an embodiment of fried food production equipment comprising this invention;

FIG. 2 is a similar lay-out in elevation as seen from the line 2—2 of FIG. 1;

FIG. 3 is a plan view of the frying unit;

FIG. 4 is a longitudinal sectional view, taken substantially on the line 404 of FIG. 3;

FIG. 6 is a plan view, with parts broken away, of the tubular fat heating unit;

FIG. 7 is a transverse section on an enlarged scale, taken substantially on the line 707 of FIG. 4;

FIG. 8 is a detail longitudinal section taken substantially on the line 808 of FIG. 7;

FIG. 9 is a plan view on an enlarged scale of the entry portion of the frying unit and the conveyor means for introducing products thereto;

FIG. 10 is a longitudinal section taken substantially on the line 10—10 of FIG. 9;

FIG. 14 is a diagrammatic view in elevation of the conveyor means employed in the continuous flow proofer;

FIG. 15 is a detail vertical section taken transversely of the proofer through one of the belt supporting frames adjacent one longitudinal end thereof;

FIG. 16 is a detail sectional view similar to FIG. 15 taken adjacent the middle cross support of one of the belt supporting frames;

FIG. 17 is a detail vertical section taken longitudinally through one of the belt supporting frames;

FIG. 18 is a detail section on an enlarged scale through a longitudinal member of one of the belt supporting frames;

FIG. 19 is a plan view of the separator and loader means interposed between the outlet end of the make-up section and the inlet end of the proofer;

FIG. 20 is a side elevational view of the separator and loader mechanism;

FIG. 21 is an end elevational view of the unit of FIG. 20 as seen from the right-hand side of the latter;

FIG. 22 is a detail vertical section taken longitudinally through the upper conveyor portion of the separator and loader means; and FIG. 23 is a top plan view of a side portion of the mechanism of FIG. 22, with parts thereof broken away.

Figure 5:
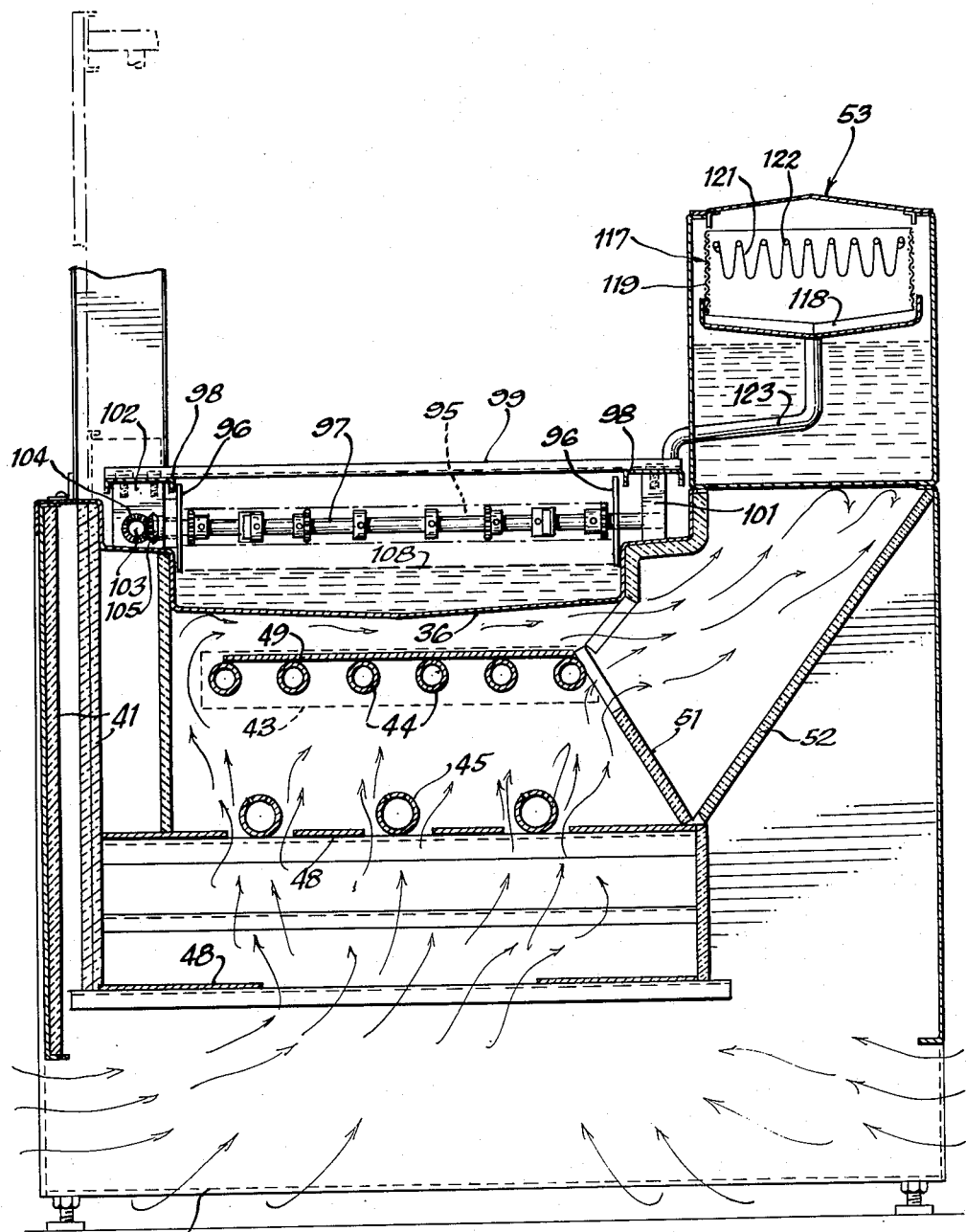
FIG. 5 is a transverse sectional view on an enlarged scale and taken substantially on the line 505 of FIG. 4.

Referring more particularly to FIG. 1 of the drawings, a food production mechanism embodying the features of the invention is therein illustrated diagrammatically in plan as incorporating with a suitable dough piece make-up section, indicated generally by reference numeral 25, a separator and transfer section 26, a continuous flow proofer 27 and a continuous flow fryer, indicated generally by reference numeral 28. The relative arrangement of these several parts as illustrated in FIG. 1 is that which is preferred for the purpose of employing a minimum amount of floor space, although it will be apparent that other arrangements thereof are readily available. The dough piece make-up section 25 may comprise any desired combination of well-known units for making up and delivering the desired dough pieces in closely adjacent relationship relative to each other. In the illustrated embodiment, this dough piece make-up section 25 includes an endless belt conveyor 29 (best seen in FIG. 19) having a standard dough sheeter 31 mounted at its receiving end, a suitable cross roller 32, and a rotary die cutter 33 spaced from each other along the conveyor in the usual manner. The details of the cutter 33, for example, will depend upon the type of product which it is desired to fry, and the same considerations will determine what specific units are employed in this make-up section 25. In the form illustrated, yeast raised doughnuts will initially be described as the selected product, and suitable dough pieces 34 are illustrated in FIG. 19 diagrammatically as coming from the rotary die cutter 33 and being delivered by the belt conveyor 29. These dough pieces 34 may be circular in plan outline or, preferably, hexagonal, the latter shape better lending itself to automatic production by virtue of eliminating any dough web portions separating the adjacent dough pieces 34. The separator and transfer section 26 spaces the dough pieces 34 from each other both in the direction of movement thereof and in a direction normal thereto. This is accomplished in a manner which will be more specifically described hereinafter with reference to the details of construction of this section 26 by employing in the latter a belt conveyor travelling at a higher rate of speed than the conveyor 29 and angularly disposed relative to the latter. As thus separated from adjacent dough pieces 34, the latter are delivered to the continuous flow proofer 27 through which they are travelled for a sufficient length of time to enable the yeast dough to raise in well-known manner, the interior of the proofer 27 being automatically maintained at proper temperature and moisture content to effect such raising of the dough.

From the outlet end of the proofer 27, at the left of FIG. 1, the raised doughnuts are delivered by means of a chain conveyor 35 to the inlet end of the continuous flow fryer 28. As best illustrated in FIGS. 3, 4, 5 and 7, the frying unit 28 comprises an elongated and very shallow pot or basin defining a cooking trough 36 which is mounted upon and supported in any suitable manner by vertically disposed end sections 37 and 38 at the inlet and outlet ends, respectively, of the trough and a substantially centrally located intermediate column structure 39 (FIG. 4). These supporting sections 37, 38 and 39, together with suitable insulated side wall structures, such as 41 in FIG. 5, substantially enclose the space below the trough 36 which is employed to receive and house a novel cooking fat heating unit. This heating unit comprises an inlet manifold 42 (FIGS. 4 and 6), an outlet manifold 43, and a plurality of heating tubes 44 which are interconnected at opposite ends, as by welding, to the respective manifolds 42 and 43 and extend longitudinally of the cooking trough 36 in spaced relationship thereto and to each other in the arrangement best illustrated in FIG. 5. The manifolds 42 and 43 and heating tubes 44 thus form a unitary assemblage which is so supported intermediate its ends and adjacent the outlet manifold 42 by the intermediate column 39 and end section 37, respectively, as to permit of limited movement longitudinally of the tubes 44 relative to the supporting structure in order to compensate for variations in length of the unit resulting from temperature changes thereof. As shown in FIG. 4, a suitable drain 43a may be connected to a low point of the manifold 43.

Disposed below the tubes 44, as best seen in FIGS. 4 and 5, are suitable burners for heating these tubes which, in the illustrated embodiment of the invention, comprise duplicate units each made up of three burner tubes 45, each spaced from the laterally adjacent tube so as to effect direct heating of two of the tubes 44. The burner tubes 45 are supplied at their inner ends with a suitable gas and air combustion mixture from the usual manifolds 46 which are in turn connected to a centrally disposed gas supply pipe 47. The primary feature of novelty with respect to the burner arrangement comprises the location of the burner tubes 45 directly below and substantially co-extensive longitudinally with the tubes 44. Suitable horizontal baffles 48 are arranged below the burner tubes 45 in the manner illustrated in FIGS. 4 and 5 to direct the distribution of both primary and secondary air thereto. The hot gases comprising the products of combustion of these burner tubes 45 directly contact the heating tubes 44 for the purpose of maintaining the latter at a relatively high temperature and in the interest of economy of operation. In order to prevent direct impingement of these hot gases against the bottom surface of the cooking trough 36, an additional horizontal baffle 49 of suitable insulation characteristics is mounted directly above the heating tubes 44. While the outer side wall structure of the fryer unit terminates short of the floor or other supporting surface to provide for a sufficient quantity of air to the burners, the upper portions thereof are imperforate to prevent the escape of heated gases. On the other hand, the upper portion of the inner side wall structure of the fryer unit 28, as illustrated in FIG. 5, includes an angularly disposed wall member 51 extending inwardly of the unit and provided with suitable apertures both above and below the heating tubes 44 as outlet passages for the hot gases generated by the burner tubes 45. The inner wall structure of the fryer unit also includes a second angularly disposed wall member 52 for the purpose of directing such heated gases into contact with the bottom surface of a fat reserve tank 53 supported in suitable manner by the inner side wall structure and the sections 37, 38 and 39. This reserve tank 53 extends longitudinally for almost the full length of the cooking trough 36 and is laterally spaced inwardly therefrom, as shown in FIG. 3. Suitable exhaust stacks 54 (FIGS. 3, 4 and 9) lead upwardly from the heating space defined by the walls 51 and 52 and the bottom of tank 53 at each end of the latter.

At its outlet end, to the right in FIGS. 3 and 4, the cooking trough 36 is depressed or formed to provide a suitable sump 55 which, as best shown in FIG. 6, is suitably connected to the inlet side of a fluid pump 56. The outlet side of this pump 56 is connected through a manually operable valve 57 to the inlet manifold 42 by means of a pipe 58. The valve 57 is adapted to be selectively operated by means of a handle 59 (FIG. 3) to direct the flow from pump 56 either into this connecting pipe 58 or a pipe 61 leading back to the reserve tank 53, for a purpose to be later described. When the valve 57 is in its normal position to direct the flow of cooking fat from pump 56 into the inlet manifold 42 through pipe 58, a selected portion of the pumped fat may be diverted into the reserve tank 53 for filtering purposes by means of a suitable pipe 62 connected at one end to the pipe 58 and having a manually adjustable valve 63 interposed therein.

The outlet manifold 43 is connected intermediate its ends with a supply pipe 64, preferably having two branches 65 and 66, for delivering heated cooking fat to the inlet end of the cooking trough 36. In the specific embodiment herein illustrated, the branch supply pipe 65 is orificed adjacent its outlet end (FIG. 6) to deliver a cascade of heated cooking fat down an inclined bottom surface or apron 67 (FIGS. 9 and 10) which is disposed below and supports the lower end of the chain conveyor 35. At its lower edge, this apron 67 is extended horizontally to provide the bottom of a laterally extending trough 68 which communicates directly with the inlet end of the cooking trough 36. Disposed within the inner or far end portion of this lateral trough 68 is a descendingly stepped riffle feed or spray head 69 connected at its deepest outer end with the other branch 66 of the supply pipe 64, decreasing in thickness towards its inner ends, which may be shaped as illustrated in FIG. 9 and laterally apertured at longitudinally spaced intermediate points to cascade heated cooking fat into and along the lateral trough 68 in the manner illustrated in FIG. 9 by the small arrows. It is preferred that the branch supply pipes 65 and 66 be provided with suitable manually operable valves 71 to selectively control the relative quantities of cooking fat flowing through these two supply branches.

The opposite or front end of the outlet manifold 43 is connected by a third supply pipe 72 to an apertured end thereof 73 extending laterally across the cooking trough 36 intermediate the ends of the latter and at the forward end of a sloping depression 74 provided in the bottom wall of the cooking trough (FIGS. 4, 7 and 8). As shown in FIG. 6, this third supply pipe 72 has a suitable manually operable valve 75 and an expansion joint 76 of well-known construction interconnected therein, the latter compensating for any movement of the outlet manifold 43 relative to the rigidly mounted intermediate delivery pipe 73. The purpose of the latter is to maintain the temperature of the heated cooking fat as nearly uniform as possible throughout its flow from one end of the trough 36 to the other.

By means of a pipe 77 connected at its lower end to the supply pipe 73 (FIG. 6), a top oiler or overhead spray unit 78 (FIGS. 3, 4, 7 and 8) suitably mounted above and extending laterally across the cooking trough 36 adjacent the intermediate supply pipe 73 may be provided with heated cooking fat for a purpose to be later described, the pipe 77 being connected at its upper end to this spray unit 78 and having a suitable manually operable valve interconnected therein. Directly rearwardly, or to the right in FIGS. 3, 4 and 8, of the top oiler 78 is located a gate or perforated bar 79 extending transversely across the cooking trough 36 and secured by welding, or the like, to the lower ends of two straps 81 which are attached in any suitable manner at their upper ends to horizontally extending angles 82. The angles 82 are mounted upon and secured to a transverse shaft 83 and extend forwardly therefrom to receive and mount a suitable counter-weight 84 extending transversely therebetween. The ends of the shaft 83 are pivotally supported by brackets 85 upstanding from the side portions of the trough 36, and lateral movements of the shaft are prevented by suitable spacer collars 86 attached thereto. As best seen in FIG. 7, the outer or left-most collar 86 also is secured to one end of an operating lever 87, the other end of which is pivotally connected to the upper end of a vertically disposed rod 88 (FIG. 3). A second identical apertured gate 89 is mounted adjacent the right-hand or outlet end of the trough 36 (FIGS. 3 and 4). The counter-weights 84 normally maintain these gates 79 and 89 in their upper full line position of FIG. 8. Lifting of the rods 88, either manually or by means of solenoids and a suitable electrical timing control which preferably is mounted in the intermediate supporting column 39, will lower the gates to their operative position, as illustrated in broken lines at 79a in FIG. 8, for the purpose of blocking movement of the dough pieces 34 along the cooking trough 36 under certain circumstances, as will be later described.

At the outlet or right-hand end of the cooking trough 36 (FIGS. 3 and 4) is mounted a chain conveyor 91 by means of a pair of side plates 92 which rest at their lower corners in a depressed portion of the trough 36 and are suitably rotatably mounted at their upper ends on a transverse shaft 93. The shaft 93 is journalled in suitable brackets attached to the marginal portions of the trough 36, carries the usual sprockets for driving the chain conveyor 91, and has a driven sprocket 94 (FIG. 3) mounted on its inner end. As will be more readily apparent from the following description, the lower end of the conveyor 91 is disposed below the surface of the cooking fat flowing through the trough 36, so that the conveyor will function to automatically remove the completely cooked food products from the trough.

A similar chain conveyor 95 is mounted intermediate the ends of the trough 36 adjacent the gate 79 and directly downstream therefrom. This conveyor 95 is for the purpose of inverting the food products or dough pieces, and is mounted for adjustment as a unit longitudinally of the trough. To this end, a pair of side plates 96 journals a pair of upper and lower transverse shafts which carry the usual sprockets for driving the chain conveyor 95, and the upper of these shafts 97 is journalled in a longitudinally slidable frame comprising frame members 98 (FIG. 3) which are interconnected by struts 99. The inner frame member 98, as shown in FIG. 5, is secured to a bearing block 101 which journals the inner end of the upper shaft 97, and this block 101 merely rests upon the marginal portion of the cooking trough 36.

The outer frame member 98 is secured to a depending bearing block 102 which is journalled on a drive shaft 103 extending longitudinally of the trough 36 and connected by suitable gears at its outer end to the shaft 93. Splined on this shaft 103 is a beveled drive pinion 104 rotatably secured in any suitable manner to the bearing block 102, and the pinion 104 meshes with a similar beveled gear 105 which is secured to the outer end of the upper shaft 97. With this arrangement, the dough piece inverter means comprising the chain conveyor 95 and its supporting structure may be slid along the drive shaft 103 for selective positioning longitudinally of the cooking trough 36, and may be pivotally swung upwardly about the drive shaft 103 to an inoperative position, as illustrated in broken lines at the left side of FIG. 5, whenever its use is not desired and to facilitate cleaning of the cooking trough.

Extending transversely across the cooking trough 36 adjacent the downstream end of the chain conveyor 95 (FIG. 4) is an upwardly humped or curved portion or plate 106 that is secured to the trough 36 for the purpose of guarding against backward movement of the dough pieces as they are dropped from the upper end of the chain conveyor 95 and to insure their being turned over and continuing their floating travel by the cooking fat flowing over this curved plate or hump 106. Also mounted on the bottom of the cooking trough 36 and extending transversely across the same are a plurality of transverse riffle plates 107 which are employed to insure proper floating movement of the dough pieces along the cooking trough by the heated fat flowing therethrough. In the preferred embodiment, three of these riffle plates 107 are mounted as a unit in the first half of the trough 36 and two as a similar unit in the second half of the trough. It will be understood that these riffle plates may be slid along the bottom of the trough to enable them to be selectively adjustably positioned therein. Each of the plate members 107, as best seen in FIG. 4, extends upwardly from the bottom of the trough 36 to within a short distance from the normal position of the upper surface of the cooking fat flowing therethrough, the latter being represented in FIG. 4 by the broken lines 108. The plates 107 thus function to increase the surface rate of flow of the cooking fat a spaced points along the trough 36, in the manner of rapids, which has been found to insure proper floating movement of the dough pieces by maintaining proper alignment thereof and preventing lagging, jamming, over-riding or trapping of the food products during their movement through the trough 36.

As shown in FIGS. 3 and 4, the right end of the reserve tank 53 has an outlet pipe 109 connected thereto at its inner end and opening over the cooking trough 36 at its outer end. The inner end of this pipe 109 is disposed with its lowest point at a position two inches above the bottom of the tank 53 for a purpose to be later described. A manually operable valve 111 is mounted in this outlet pipe 109. An emergency fill line or pipe 112 is connected at its inner end to the bottom of the tank 53 so that all liquid in the latter may be drained therethrough, and the outer end of this pipe 112 is open and extends over the cooking trough 36 in a manner similar to the outlet pipe 109. An electrically or solenoid actuated valve 113 is interconnected in this fill line 112. This valve 113, which is normally closed, is automatically opened under the control of a float mounted in the sump 55 and having a rod 114 (FIG. 3) extending upwardly therefrom and adjustably mounting a suitable collar for closing a normally open micro-switch connected in series with the solenoid for opening the valve 113, in a manner to be later described.

Also as shown in FIG. 3, the upper right-hand end of the reserve tank 53 is open to facilitate delivery of cooking fat thereto by the pipes 61 and 62, and preferably is provided with a downwardly sloping channel member 115 for receiving liquid cooking fat from a supply hose, or the like, which may be connected to the usual barrel heating and pumping unit (not shown). A downwardly sloping pan 116 also is mounted at this upper end of the reserve tank 53 into which the pipe 62 directs its flow. As shown in broken lines in FIG. 4, this pan 116 drains into a filter 117 which, as illustrated in FIG. 5, preferably comprises a base or collecting pan 118 supporting side wire screens 119 and cloth filters 121 mounted in folded depending form from longitudinally extending rods 122. The pan 118 slopes in both directions towards its center, where it is provided with a drain pipe 123 that extends laterally through the wall of the reserve tank to drain the filtered cooking fat back into the trough 36.

The operation of the production fryer unit 28 thus far specifically disclosed will now be described. The dough pieces to be fried therein, such as yeast raised doughnuts delivered by the continuous flow proofer 27, may be introduced into the fryer by means of the chain conveyor 35 which, as best seen in FIGS. 9 and 10, is constructed generally similar to the chain conveyors 91 and 95. Before starting a production run, it is first necessary to fill the system to the proper level with cooking fat heated to the necessary temperature. The cooking fat is either introduced into the reserve tank 53, or would be stored therein from a preceding run. Lighting of the gas burners 45 will melt the fat in the reserve tank, if it has been standing therein for a sufficient time to solidify. The operator merely opens the valve 111, which permits the cooking fat to flow from the tank 53 through the outlet pipe 109 into the trough 36. Starting of the motor for the pump 56 and setting of the valve handle 59 to its normal position to direct the outlet flow from the pump into the pipe 58 will initiate circulation of the cooking fat through the heating unit comprising the tubes 44. As soon as the desired surface level of the cooking fat has been attained in the cooking trough 36, as indicated by the broken line 108 in FIG. 4, the valve 111 is adjusted to reduce the flow of fat from the reserve tank 53 to that estimated to be required to make up the normal loss of fat that will be attendant with its absorption by the dough pieces being cooked.

Thereafter, and throughout the ensuing production run, such make-up quantity of cooking fat will continue to be supplied to the trough 36 from the reserve tank 53. If the level of the cooking fat in the tank 53 is thus lowered to a point two inches from the bottom of the tank, the outlet pipe 109 will be unable to continue to supply the necessary make-up fat. At that time, the float mounted in the sump 55 will be lowered by the resulting slight decrease in depth of cooking fat in the pot or trough 36 which, through the agency of rod 114 of the float, will automatically close the float controlled switch that energizes the solenoid actuated valve 113 to open the latter and cause drainage from tank 53 into the trough 36 through emergency line 112 of an emergency supply of cooking fat comprising the remaining two inches of fat in the bottom of the reserve tank. At the same time, a second adjustable collar on the float rod 114 will close another microswitch to sound an alarm buzzer and preferably to initiate operation of a standard barrel pump for replenishing the supply of cooking oil from the usual barrel into the reserve tank 53. This latter replenishing may, if desired, be accomplished manually. As the level of cooking oil in the reserve tank 53 is again thus raised above two inches from the bottom of the tank, the float control described will de-energize the solenoid actuating valve 113 to cause the latter to be automatically closed, and the supply pipe 109 will again take over its normal function. After a production run, the cooking fat may be returned to the reserve tank merely by closing the valve 111 and moving valve 59 to connect the outlet from pump 56 to pipe 61.

During normal operation of this cooking unit, the heated cooking fat being pumped through supply pipes 65 and 66, by virtue of the sloping surface 67 and the cascade effect obtained from the descendingly stepped spray head 69, will rapidly carry the dough pieces delivered by the conveyor 35 away from the lower end of the latter through the trough 68 and into the inlet end of the main cooking trough 36, as indicated by the arrows in FIGS 3 and 9. Because of the difference in cross sectional dimensions normal to the path of flow between the troughs 68 and 36, the rate of flow of the cooking fat will be more rapid in the trough 68. This is desirable and accomplished as above described to insure against interference between the various dough pieces just deposited in the channel 68 and those being so deposited from the conveyor 35. It has also been found desirable to include curved guide members such as 124 in FIG. 9 and 125 in FIG. 3 to prevent trapping of any of the dough pieces in corners of the troughs.

During the initial operation of a production run, it will be found desirable to retain those dough pieces first introduced into the cooking trough 36 for a slightly longer cooking period, both as to their obverse and reverse sides. This is the purpose of the gates 79 and 89 previously described. Either manually, or by initiating operation of the automatic timing mechanism earlier referred to, the operator will move these gates to their lowered operative positions, as shown in FIG. 8, where they will restrain the floating movement of the dough pieces for a predetermined length of time. Thereafter, the gate 79 will be raised to its normal inoperative position, either manually or by the noted timer mechanism, and the dough pieces 34 will continue their floating travel along the trough 36. As they are floated onto the inverter or intermediate conveyor 95, the latter will carry them up, out of, and drop them back into, the fat stream in up-side-down position. The previously fired bottom or reverse sides are thus exposed and the former top or obverse sides submerged, and the flowing stream of cooking fat will continue to carry the cooking dough pieces along the trough 36. When they reach the second gate 89 when it is in lowered operative position, they will again be restrained for sufficient length of time to insure proper cooking, when this gate 89 will be raised to its normal inoperative position, either manually or by means of the previously mentioned timing mechanism. The flowing stream of cooking fat will thereafter float those cooked products and all subsequent ones onto the end conveyor 91 which will automatically remove the completely cooked products from the fryer.

As previously noted, the riffle plates 107 are extremely effective in maintaining proper movement of the dough pieces through the trough 36, which movement is continuous after the initial ones have been cooked. In order to prevent cracking of the obverse surfaces of certain types of dough pieces, to control expansion thereof and to eliminate a central color dividing line, the spray head 78 may be employed, either intermittently or continuously, to spray heated cooking fat onto the dough pieces as they pass thereunder.

It will be appreciated that the inverter means or intermediate conveyor 95 functionally divides the cooking trough 36 into a first basin in which the reverse sides of the dough pieces are submerged and a following or second basin wherein the obverse surfaces of the dough pieces are submerged. By virtue of the mounting of this conveyor 95 for adjustment longitudinally of the cooking trough 36, the cooking periods for each dough piece in these two basins may be selectively inversely proportionately varied as desired, the primary purpose for such adjustment being to compensate for variations in expansion of the dough pieces in the different basins.

The cooking fat heating unit and the resultingly rapid rate of movement of the fat therethrough prevents any possible scorching of the fat. In addition, and partially because of the described arrangement of introducing a portion of the freshly heated fat at a point intermediate the length of the cooking trough 36 by the supply head 73, and by virtue of the described heating of the cooking through, the temperature drop of the cooking fat during a complete cycle is held to considerably less than ten, and in the closer neighborhood of five, degrees Fahrenheit. This is attained despite the considerable length of the cooking trough 36. Although all precautions are taken and this mechanism handles the dough pieces very gently, some particles will be dislodged from the dough pieces from time to time. Consequently, it is desirable to filter the cooking fat, and the previously described arrangement of parts for this purpose has the distinct advantage of not interfering in any way with continuous cyclic circulation and heating of the cooking fat. During operation of the unit, a predetermined proportion of the cooking fat is diverted through the pipe 62, by selective adjustment of the valve 63, into the pan 116, through the filter unit 117 and the drain pipe 123 back into the cooking trough 36. Such continuous filtering of a portion of the cooking fat is extremely effective in maintaining the entire supply of fat clear of foreign material.

Since it is intended that this continuous flow frying unit 28 also be available for use in producing cake doughnuts, suitable means are provided for enabling it to be so employed. A cake doughnut dough piece dropper of well known construction, and indicated generally by reference numeral 126, is shown in FIG. 1 as mounted at the inner or far end of the trough 68 where it will successively deposit cake doughnut dough pieces into the stream of cooking fat supplied to that trough. A modified arrangement for the cake doughnut dropper 126 is illustrated in FIG. 3, wherein the hopper thereof is shown in plan as mounted directly adjacent the forward edge of the cooking trough 36 and the gate 79. With this arrangement, a motor 127 forming the actuating means for the dropper 126 may be mounted upon the upper portion of the intermediate column structure 39. The cooking trough 36 is provided with an upstanding and longitudinally extending wall member 128 (FIG. 3) which defines a passage extending from directly below the hopper of the cake dropper 126 toward the left or entry end of the cooking trough 36 and terminating a short distance therefrom. A suitable chain conveyor 129 is mounted in the bottom of this passage for conveying the dough pieces from the dropper 126 to the left-hand or entry end of the cooking trough 36. From that point, as with the other location of the cake doughnut dropper 126 shown in FIG. 1, the frying and handling of such cake doughnuts is conducted in the same manner as that previously described with respect to dough pieces introduced into the fryer by means of the conveyor 35. As will be noted from FIG. 3, the motor 127 may be employed, if desired, to drive this chain conveyor 129. The positioning of the dropper 126 as illustrated in FIG. 3 has the advantage of placing the same within ready reach of an operator normally located directly adjacent that point. On the other hand, the placement of the dropper 126 at the point shown in FIG. 1 eliminates the necessity for the chain conveyor 129 and the forward extension of the cooking trough 36 to accommodate the same. After the doughnuts or other products have been cooked in the continuous fryer unit 28 in the manner so far described, the same may be conducted to glazing or icing, cooling, packing, etc. equipment, as desired.

In order to effect satisfactory continuous production of raised yeast doughnuts or other products made from raised dough, it is necessary that the speed of operation of the continuous flow proofer 27 and the continuous flow fryer 28 be synchronized. To this end, the rate of flow of the cooking fat may be selectively adjusted by means of the manually operable valve 63. The chain conveyors 35, 91, and 95 may be driven by the same variable speed source of power as that employed to actuate the conveyor mechanism incorporated in the proofer 27, as illustrated in FIG. 14. Or the conveyors 35 and 91 may be separately driven by suitable varidrive motors or other variable speed sources of power. It will be noted from FIG. 3 that the conveyor 91 is drivingly connected to the shaft 103 which in turn actuates the inverter 95.

Figure 11:
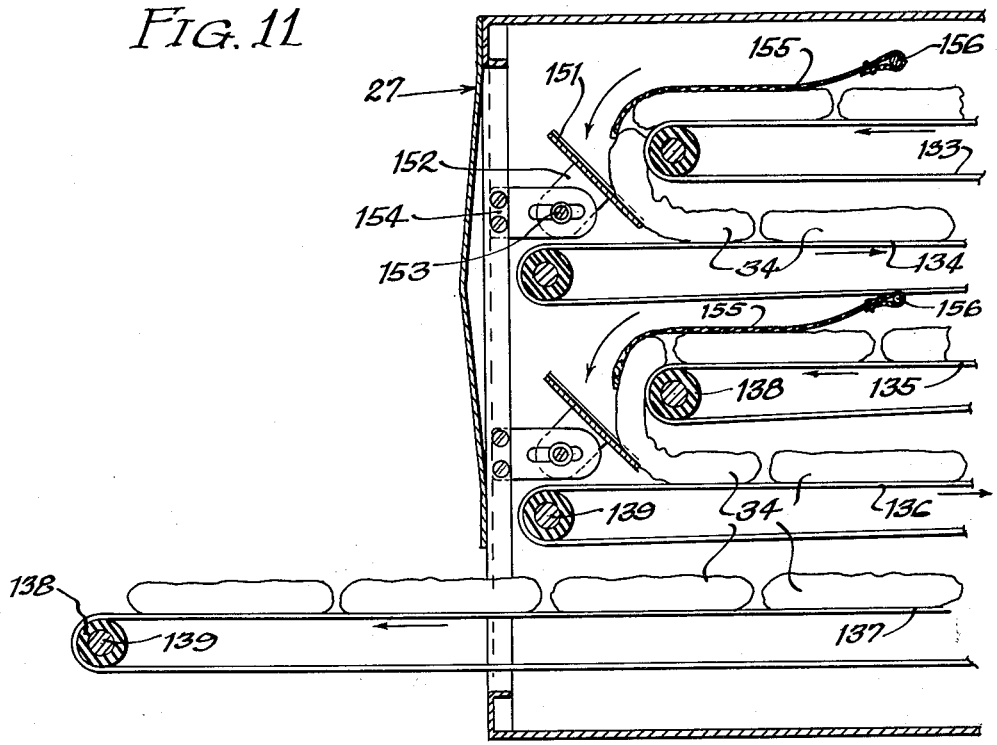
FIG. 11 is a vertical longitudinal section through the outlet end portion of the continuous flow proofer.
Figure 12:
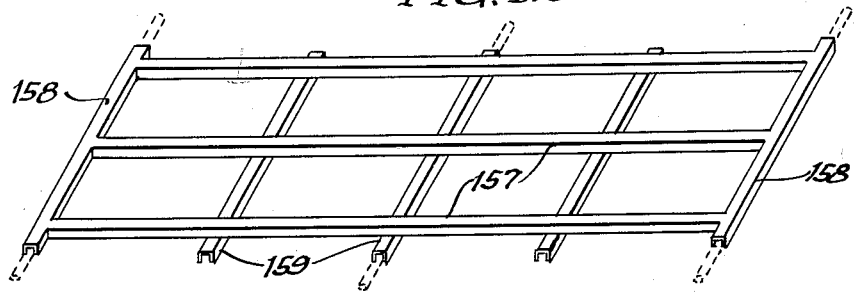
FIG. 12 is an isometric view of one of the belt supporting frame units employed in the proofer.
Figure 13:
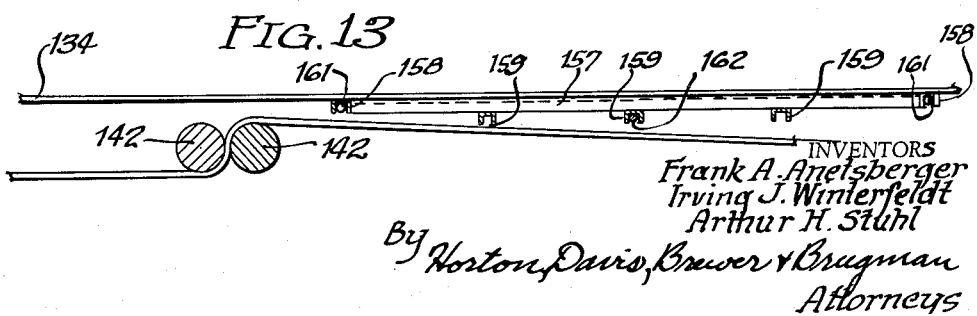
FIG. 13 is a detail vertical section taken longitudinally of the proofer through one of the belt supporting frames.

Referring now to FIGS. 1 and 2, it will be seen that the continuous flow proofer 27 comprises a main housing or cabinet maintained at the proper temperature and humidity in well known manner, as by means of an automatic steam supply means 131 and a plurality of ducts 132 extending therefrom to various parts of the proofer cabinet. As best seen in FIGS. 11 and 14, the conveyor means employed for traveling the dough pieces back and forth for the desired length of time within the proofer cabinet 27 comprises, in the illustrated embodiment, five separate belt conveyors 133 through 137, inclusive. Each of these belt conveyors has upper and lower runs which move in the directions indicated by the arrows thereon in FIG. 14 and pass over end rollers which, as illustrated in FIGS. 9 and 10, each comprise a crepe rubber roller 138 mounted and secured to a shaft 139. The shafts 139 extend parallel to each other transversely of the cabinet of the proofer 27 and are journalled adjacent their ends, as by means of suitable bearing brackets 141 mounted upon the side walls of the proofer cabinet.

The lower runs of each of the top four conveyors 133 through 136 have their left end portions raised above the upper run of the next lower adjacent belt by passing between knurled steel offsetting rolls 142 (FIG. 14). The lower runs of each of the five belts also pass over suitable drive rolls 143 and adjacently located take-up rolls 144, which preferably are spring urged in the direction of the arrows 145. Each of the drive rolls 143 is provided at one end with a suitable drive sprocket, and a chain drive 146 passes successively around or in driving engagement with each of these sprockets and a main driving sprocket 147. Suitable power means is provided for driving the main sprocket 147 which preferably includes suitable means for varying the speed of rotation thereof. As will be seen from FIGS. 11 and 14, the delivery end of each of these belt conveyors 133-137 terminates somewhat short of the receiving end of the next adjacent lower one of the belts. Thus, dough pieces reaching the end roll 138 of any of these conveyors at the delivery end thereof will be deposited by gravity upon the next adjacent lower belt to be carried thereby back through substantially the entire length of the proofer 27. As shown in FIG. 14, the receiving end of the uppermost belt 133 is carried downwardly over an extra one of the rollers 138 to receive dough pieces supplied by an auxiliary conveyor 148 which is driven in timed relation to the other belts of the proofer by a chain drive 149.

As some of the different types of dough pieces with which the continuous proofer 27 is employed pass from one of the conveyor belts to the next lower belt, they may become misshapen or folded up upon themselves because of their particular size or dimensions. This is true, for example, of dough pieces for long johns. Means therefore are provided to obviate such misshaping of the dough pieces as the same pass from one of the belt conveyors to the next lower one. As best illustrated in FIG. 11, the present embodiment of this means comprises adjustable guide means in the form of a plate 151 extending transversely across and slightly above the receiving end of each of the belt conveyors within the proofer. Each of these plates 151 is provided with tapped mounting ears 152 adapted to receive a bolt 153 extending through a slot in a mounting bracket 154 secured in any desired manner to a suitable frame portion of the proofer 27. With such arrangement, it is a simple matter to adjust the position of the plates 151, both angularly and space-wise, relative to their associated belts. These guide plates 151 overcome the inertia of the dough pieces in the direction of their movement by the delivering belt and slidingly redirect their movement in the opposite direction without causing anything but a temporary squeezing of the originally lower surfaces thereof, which temporary distortion is substantially immediately eliminated by virtue of the elasticity of the dough. As seen from FIG. 11, each guide plate 151 preferably is vertically corrugated to prevent elongated dough pieces, as for long johns, from falling sideways. To further assist in the change of direction of the dough pieces without alteration of their shape, canvas skirts 155 are hung transversely across the proofer adjacent the delivery end of each of the belt conveyors on transverse rods 156, in the manner illustrated in FIG. 11.

In addition to the offsetting rolls 142 previously described, further means are provided for preventing sagging of the several runs of the belt conveyors, which are illustrated in FIGS. 12, 13, and 15 through 18. Each of these means comprises a removable belt supporting frame made up of a plurality of longitudinally extending bars or channels 157 secured at their ends, as by welding, to transversely extending channel members 158. Intermediate their ends, the bars 157 are similarly secured at their under sides to transversely extending channel members 159. Two end supporting rods 161 and a centrally located rod 162 (FIG. 17) are secured in groups transversely of the proofer 27, as by butt welding the ends thereof to the supporting frame or side walls of the proofer cabinet (FIGS. 15 and 16), in the relative positions illustrated in FIG. 14. The upper surfaces of the bars 157 and channels 158 are covered by a thin film 163 of a suitable synthetic plastic, such as tetrafluoro ethylene, adhered thereto for protection of the belts and to prevent marking thereof. With this arrangement, the dough carrying surfaces of the belt conveyors are maintained clean and all contact between the different runs of the several belts and between their lower runs and the dough pieces being carried by the adjacent belt is prevented.

Referring now to FIGS. 19 through 23, the dough piece separator and loader unit 26 will be described in detail. This unit, as best seen in FIGS. 20 and 21, is mounted upon a wheeled carriage 164 having a driving motor 165 and a suitable variable speed reduction unit 166 housed therein for actuating a drive chain 167. A conveyor frame 168 is mounted on the carriage 164 by means of suitable adjustable leveling bolts 169. With this arrangement, the conveyor frame 168 might be positioned as desired relative to both the belt conveyor 29 of the make-up unit 25 and the conveyor 148 for transferring the dough pieces to the proofer unit 27. The side rails of the conveyor frame 168 are suitably apertured to receive anchoring means for securing the same to brackets 171 adjustably mounted upon the conveyor frame portions of the units with which the separator is to be employed.

As best seen in FIG. 22, angularly disposed and transversely extending guide plates 172 are provided with suitable end flanges secured to the side members of the conveyor frame 168. Formed as an extension of the guide plate 172 at the receiving end of the unit is a transversely extending guide bar 173, of substantially triangular cross section with a rounded outer edge, which is also secured in any suitable manner to the side members of the conveyor frame 168. Rotatably mounted adjacent the lower end of the other guide plate 172 is a knurled steel roller 174. As shown in FIG. 23, the ends of this roller 174 are journalled in bearing brackets 175 each of which is threadedly engaged by an adjusting bolt 176 extending through a suitable aperture in the conveyor frame 168. Extending across the central portion of the conveyor frame 168 adjacent the lower edge thereof are a pair of knurled steel rollers 177 which are journalled at their ends in suitable bearings 178 secured to the conveyor frame. A crepe rubber roller 179 disposed in close peripheral relationship to both of the steel rollers 177 is secured to a transverse shaft 181 which is mounted at its opposite ends in bearing blocks 182 slidably disposed in suitable vertical slots in the side portions of the conveyor frame 168 and threadedly engaging an adjustable compression bolt 183 extending downwardly through a tapped portion of the conveyor frame and having a lock nut 184 mounted thereon. An endless conveyor belt 185 extends across the two guide plates 172 around the guide bar 173 and roller 174 and up between the rollers 177 and the rubber drive roller 179 and over the upper portion of the latter. Movement of the upper run of this belt 185 is accomplished from right to left in FIGS. 22 and 23 by engagement of the drive chain 167 with a drive sprocket 186 (FIG. 23) rigidly secured to an outer end of the shaft 181.

A dough piece feed means in the form of a wire roller 187 is mounted in closely spaced relationship relative to the receiving end of the belt conveyor 185. The wire roller 187, as best seen in FIG. 23, comprises wire rods spaced peripherally around suitable mounting discs some of which are secured, as at 188, to a transverse roller driving shaft 189 that is journalled adjacent its ends in the lower ends of adjustable mounting arms 191. The upper ends of these arms 191 are secured to the outer ends of a transverse rod 192 that extends through suitable horizontally disposed slots 193 in the side members of the conveyor frame 168 (FIG. 22). The upper flange of each of the side members of the conveyor frame 168 also is provided with a slot 194 (FIG. 23) through which an adjusting bolt 195 extends that is threadedly engaged adjacent its lower end in a suitable tapped member rotatably secured on a horizontal axis to the associated mounting arm 191. With this arrangement, the position of the wire roller 187 may be accurately adjusted as desired, in both horizontal and vertical directions, relative to the receiving portion of the belt 185 passing around the thin edge of the guide bar 173. One end of the driving shaft 189 of the wire roller 187 has a drive sprocket 196 secured thereto (FIG. 23) which is driven from a sprocket 197, that is mounted upon the main drive shaft 181, by means of a suitable chain 198 (FIG. 20). The relationship of the several parts is such that the peripheral speed of the wire roller 187 is the same as the lineal speed of the conveyor belt 185.

In operation, the lower run of the belt 185 passing under the guide bar 173 is located in as close as possible relationship to the belt conveyor 29 without having a scraping contact therewith, and the separator unit 26 is secured in an angular relationship to the belt conveyor 29 in the manner of FIG. 19 to effect the desired separation or spacing of adjacent dough pieces laterally of their direction of travel. As the conveyor belt 29 delivers each dough piece into engagement with the receiving edge of the separator conveyor means, the belt 185 and the wire roller 187 will remove that dough piece from the conveyor belt 29 and start it moving in a new direction, namely, that of the upper run of the belt 185. By virtue of the angular relationship between separator unit 26 and the conveyor 29, there will be a short time interval between the instant that the first dough piece at the left in a transverse row of dough pieces on the belt 29 is removed therefrom and the instant that the next adjacent dough piece to the right thereof is engaged by the belt 185 and the roller 187. Such time interval thus is transformed into a lateral spacing or separation of these two adjacent dough pieces normal to their direction of travel.

At the same time, and this without regard to the relative angular disposition of the separator unit 26 and the supplying conveyor 29, the dough pieces will be spaced or separated from each other in the direction of their movement, because the belt 185 and the wire feed roller 187 are operated at a greater rate of speed than the supplying conveyor 29. In this respect, the wire roller 187 is of material advantage. This should be adjusted relative to the belt 185 in accordance with the vertical thickness of the dough pieces, since it should slightly depressingly engage the upper surfaces of the dough pieces. While this will temporarily deform those dough surfaces, any dough employed is of sufficiently resilient characteristics that it will almost immediately return to its original shape upon disengagement of the wire roller 187 therefrom.

This dough piece separator mechanism alone, as illustrated in FIGS. 19–23, comprises the subject matter of copending divisional application Serial No. 71,484, filed November 25, 1960.

As is illustrated in FIG. 1, the separator and transfer section 26 may equally well be employed with conveyors moving in substantially the same direction, in addition to the described arrangement wherein the make-up section 25 is disposed approximately at right angles to the conveyor means of the proofer 27. Such alternate arrangement is shown in broken lines in FIG. 1 where the proofer is diagrammatically illustrated in broken lines at 27a as extending in substantially the same direction as the make-up section 25. It will be understood also that if in-line arrangement of the fryer unit 28 and the means for feeding dough pieces thereto, such as a conveyor similar structurally to the conveyor 35, is desired to be used, the cooking fat may be introduced directly into the receiving end of trough 36 by disposing a riffle feed similar to 69 therein and connecting the same directly to the outlet manifold 43, in lieu of using pipes 64, 65 and 66 as herein illustrated.

It is thought that the invention and many of its attendant advantages will be understood from the foregoing description, and it will be apparent that various changes may be made in the form, construction, and arrangement of the parts and in the steps of the method without departing from the spirit and scope of the invention or sacrificing all of its material advantages, the form and method hereinbefore described being merely preferred embodiments thereof.

We claim:
1. Fried food production equipment for use with dough piece make-up means having a conveyor for continuously delivering dough pieces in closely adjacent relative relationship, comprising a separator disposed above and cooperating with said conveyor for removing said dough pieces from said conveyor and spacing the same from each other, a continuous flow proofer having conveyor means including a plurality of separate runs vertically spaced from each other, means for driving said runs at the same lineal speed and vertically adjacent ones thereof in opposite directions, the receiving end of each said run being spaced beyond the delivery end of the next higher run, means for delivering dough pieces from said separator to the top said run, a continuous flow fryer including a cooking trough and means for flowing cooking fat therethrough to float dough pieces along said trough substantially at said lineal speed, means driven by said proofer conveyor driving means for delivering the dough pieces from the lowest said run into said cooking trough for movement therethrough by the cooking fat, and means for automatically removing said pieces from said trough.

2. Fried food production equipment according to claim 1, wherein said separator includes means for varying the speed of operation thereof to change the spacing effected between adjacent dough pieces in the direction of their travel.

3. Fried food production equipment according to claim 1, wherein said separator includes an endless conveyor having a direction of travel angularly disposed relative to that of the conveyor of said make-up means to effect spacing of adjacent said dough piece laterally of their direction of travel.

4. Fried food production equipment for use with dough piece make-up means having a belt conveyor for continuously delivering dough pieces at a certain rate in closely adjacent relationship relative to each other both in the direction of movement thereof and normal thereto, comprising a separator disposed above and cooperating with said conveyor for removing said dough pieces from said belt conveyor and spacing the same from each other including an endless conveyor having a direction of movement angularly disposed relative to that of said belt conveyor to effect spacing of said dough pieces in a direction normal to the direction of movement thereof and means for moving said endless conveyor at a speed greater than said certain rate to effect spacing of said dough pieces in the direction of movement thereof, a continuous flow proofer having conveyor means including a plurality of separate runs vertically spaced from each other, means for driving said runs at the same lineal speed and vertically adjacent ones thereof in opposite directions, means for delivering dough pieces from said separator to the top said run, a continuous flow fryer including a cooking trough and means for flowing cooking fat therethrough to float dough pieces along said trough substantially at said lineal speed, means driven by said proofer conveyor driving means for delivering the dough pieces from the lowest said run into one end of said cooking trough, and means for automatically removing said pieces from the other end of said trough.

5. In fried food production equipment according to claim 4, means disposed in said trough intermediate the ends thereof for inverting said dough pieces.

6. Fried food production equipment according to claim 5, wherein said dough piece inverting means divides the frying time into two periods, one for the obverse and the other for the reverse sides of said dough pieces, said dough piece inverter means being mounted for adjustment longitudinally of said trough to selectively inversely proportionately vary the length of said periods.

7. In fried food production equipment according to claim 6, guide means in said proofer for assisting in the transfer of the dough pieces from a higher run to the next lower run of said conveyor means and for preventing changes of shape of said dough pieces as a result of their movement through said proofer.

8. Fried food production equipment according to claim 7, wherein said guide means is adjustable relative to said runs for cooperating with dough pieces of different size.

9. Fried food production equipment for use with dough piece make-up means having a belt conveyor for continuously delivering dough pieces in closely adjacent relationship to each other, comprising a separator mounted above said belt conveyor for removing said dough pieces from said belt conveyor and spacing the same from each other including means for varying the speed of operation thereof relative to that of said belt conveyor, a continuous flow proofer having conveyor means including a plurality of separate runs vertically spaced from each other, means for driving said runs at the same lineal speed and vertically adjacent ones thereof in opposite directions including means for selectively varying the speed of said runs, means for delivering dough pieces from said separator to the top said run, a continuous flow fryer including a cooking trough and means for flowing cooking fat therethrough, selectively operable means for varying the rate of flow of cooking fat along said trough, means driven by said proofer conveyor driving means for delivering the dough pieces from the lowest said run into one end of said cooking trough for movement therethrough by the cooking fat, and means for automatically removing said pieces from the other end of said trough.

10. In fried food production equipment according to claim 9, riffle plate members disposed on the bottom of said trough below the surface of the cooking fat flowing therethrough and adjustable longitudinally of the trough for controlling the floating movement of the dough pieces and preventing lagging or jamming thereof.

11. Fried food production equipment according to claim 9, wherein said continuous flow fryer includes heating means comprising elongated tubes spaced below and extending along said trough, burner members disposed below said tubes, pump means for circulating cooking fat through said tubes and trough, and insulating baffle means interposed between said tubes and said trough for preventing burning out of the latter while insuring heating thereof by said burner members to minimize the temperature drop of the cooking fat during movement through said trough.

12. In fried food production equipment according to claim 11, means for delivering a major portion of the cooking fat heated in said tubes to said one end of said trough, and means for delivering another portion of said heated fat into said trough at a point intermediate the ends thereof.

13. Fried food production equipment, comprising a shallow elongated cooking trough; a cooking fat heating unit including inlet and outlet manifolds, a plurality of tubes interconnecting said manifolds and disposed below and in vertically spaced relationship to said trough, and burner means disposed below said tubes for heating the same; pump means for forcing cooking fat through said manifolds and tubes for heating by said burner means, means for delivering the heated cooking fat into said trough for flow therethrough, means for introducing dough pieces into the heated fat at one end of said trough for floating movement by the fat along said trough, means for automatically removing said pieces from the other end of said trough, a reserve tank mounted laterally of and directly adjacent to said trough for a reserve supply of cooking fat, insulating baffle means interposed between said tubes and said trough for preventing burning out of the latter while insuring heating thereof by hot gases generated by said burner means, means for directing the flow of hot gases employed to heat said tubes and trough into contact with said tank for heating the reverse supply of cooking fat contained therein, and means for automatically delivering reserve fat from said tank to said pump means to compensate for fat losses during cooking and for maintaining the fat in said trough at a substantially constant level.

14. In fried food production equipment according to claim 13, fat filter means disposed in the upper portion of said reserve tank, and means interconnected between said pump means and said inlet manifold for diverting a portion of the fat from said pump means into said filter means, whereby foreign particles are removed from the cooking fat without interfering with the flow of the latter through said heating unit and trough.

15. In fried food production equipment according to claim 14, means including a selectively manually operable valve interconnected between said pump means and said cooking fat heating unit for directing all of the fat from said pump means into said reserve tank to remove the fat from said cooking trough to facilitate cleaning thereof.

16. Fried food production equipment, comprising an elongated cooking trough, cooking fat heating and circulating means for continuously flowing heated cooking fat through said trough from one end to the other thereof, means for introducing dough pieces into said one end of said trough for floating movement along the latter by said cooking fat, riffle plate members disposed on the bottom of said trough below the surface of the cooking fat flowing therethrough and adjustable longitudinally of the trough for controlling the floating movement of the dough pieces, and means disposed at the said other end of said trough for automatically removing the dough pieces therefrom.

References Cited in the file of this patent

UNITED STATES PATENTS

| | | |
|---|---|---|
| 915,010 | Young | Mar. 9, 1909 |
| 1,067,460 | Brach | July 15, 1913 |
| 1,236,405 | Cleveland | Aug. 14, 1917 |
| 1,319,190 | Van Houten | Oct. 21, 1919 |
| 1,345,301 | Winchester | June 29, 1920 |
| 1,516,962 | Gunsolley | Nov. 25, 1924 |
| 1,605,203 | Baxter | Nov. 2, 1926 |
| 1,707,786 | Ehrhart | Apr. 12, 1929 |

(Other references on following page)

UNITED STATES PATENTS

| | | |
|---|---|---|
| 1,927,786 | Hunter | Sept. 19, 1933 |
| 1,959,238 | Horsfield | May 15, 1934 |
| 2,015,187 | Mayer | Sept. 24, 1935 |
| 2,057,639 | Bergner | Oct. 13, 1936 |
| 2,092,499 | Carpenter | Sept. 7, 1937 |
| 2,104,282 | Wagener et al. | Jan. 4, 1938 |
| 2,112,309 | Santillian | Mar. 29, 1938 |
| 2,120,302 | Tubbs | June 14, 1938 |
| 2,207,316 | Ferry | July 9, 1940 |
| 2,208,874 | Toews | July 23, 1940 |
| 2,334,650 | Rugh | Nov. 16, 1943 |
| 2,371,877 | Crosland | Mar. 20, 1945 |
| 2,529,253 | Hoffman et al. | Nov. 7, 1950 |
| 2,570,127 | Hunter | Oct. 2, 1951 |
| 2,584,584 | Hoffman et al. | Feb. 5, 1952 |
| 2,652,767 | Childs | Sept. 22, 1953 |
| 2,715,869 | Salvo | Aug. 23, 1955 |

FOREIGN PATENTS

| | | |
|---|---|---|
| 587,691 | Great Britain | May 2, 1947 |
| 773,784 | Great Britain | May 1, 1957 |